(12) United States Patent
Lee et al.

(10) Patent No.: US 10,402,427 B2
(45) Date of Patent: Sep. 3, 2019

(54) SYSTEM AND METHOD FOR ANALYZING RESULT OF CLUSTERING MASSIVE DATA

(71) Applicant: SK Planet Co., Ltd., Seoul (KR)

(72) Inventors: Chae Hyun Lee, Seoul (KR); Min Soeng Kim, Seoul (KR); Jun Sup Lee, Yongin-si (KR)

(73) Assignee: SK PLANET CO., LTD., Seongnam-si (KR)

( * ) Notice: Subject to any disclaimer, the term of this patent is extended or adjusted under 35 U.S.C. 154(b) by 0 days.

(21) Appl. No.: 14/009,907

(22) PCT Filed: Oct. 31, 2012

(86) PCT No.: PCT/KR2012/008986
§ 371 (c)(1),
(2) Date: Oct. 4, 2013

(87) PCT Pub. No.: WO2013/151221
PCT Pub. Date: Oct. 10, 2013

(65) Prior Publication Data
US 2015/0032759 A1    Jan. 29, 2015

(30) Foreign Application Priority Data

Apr. 6, 2012 (KR) .................. 10-2012-0035995

(51) Int. Cl.
*G06F 16/28* (2019.01)
*G06F 16/31* (2019.01)
(Continued)

(52) U.S. Cl.
CPC ............ *G06F 16/285* (2019.01); *G06F 16/31* (2019.01); *G06F 16/35* (2019.01); *G06K 9/6219* (2013.01)

(58) Field of Classification Search
CPC ................................. G06N 99/005; G06N 5/02
(Continued)

(56) References Cited

U.S. PATENT DOCUMENTS 7,893,706 B2 *  2/2011  Lee ..................... G09G 3/006
                                                  324/760.02
9,448,999 B2 *  9/2016  Lee ..................... G06F 16/93
(Continued)

FOREIGN PATENT DOCUMENTS

KR      1020090028953 A      3/2009

OTHER PUBLICATIONS

"MapReduce Online", T. Condie, N. Conway, P. Alvaro, J. M. Hellerstein, K. Elmeleegy, R. Sears, NSDI, vol. 10, Issue 4, Apr. 28, 2010, 20 pages.*

(Continued)

*Primary Examiner* — Michael B Holmes
(74) *Attorney, Agent, or Firm* — Brinks Gilson & Lione

(57) ABSTRACT

Disclosed are a system and a method for analyzing a result of clustering massive data. An open-source map/reduce framework named Hadoop is used to calculate a silhouette coefficient corresponding to a significance verification index capable of evaluating a result of clustering massive data. To implement the system and the method for analyzing a result of clustering massive data, clustered data is divided into blocks. For all of the blocks, input splits are generated. Then, the generated input splits are assigned to multiple computers. Each computer stores only data of blocks included in an input split assigned in a memory, and calculates a silhouette coefficient for each record. Each computer provides only the calculated silhouette coefficient to an index coefficient calculation apparatus, and enables the index coefficient calculation apparatus to calculate a silhouette coefficient for a (Continued)

cluster. Therefore, the result of clustering the massive data can be rapidly and objectively analyzed.

5 Claims, 8 Drawing Sheets

(51) Int. Cl.
    *G06K 9/62*     (2006.01)
    *G06F 16/35*     (2019.01)

(58) Field of Classification Search
    USPC .......................................................... 706/14
    See application file for complete search history.

(56) References Cited

U.S. PATENT DOCUMENTS

| | | | | |
|---|---|---|---|---|
| 9,460,113 | B2* | 10/2016 | Kim | .................. G06F 16/29 |
| 9,888,349 | B2* | 2/2018 | Kim | .................. H04W 4/029 |
| 2008/0256230 | A1* | 10/2008 | Handley | .................. 709/224 |
| 2012/0054184 | A1* | 3/2012 | Masud et al. | .................. 707/737 |
| 2012/0182891 | A1* | 7/2012 | Lee et al. | .................. 370/252 |

OTHER PUBLICATIONS

"Data Analysis with Open Source Tools", Chapter 13: Finding Clusters, Philipp K. Janert, Publisher: O'Reilly Media, Inc., Publication Date: Nov. 18, 2010, 25 pages.*

"Efficient and Effective Clustering Methods for Spatial Data Mining", Raymond T. Ng., Jiawei Han, Proc. of, 1994, pp. 1-25.*

"Pro Hadoop", Jason Venner, Apress, 2009, 424 pages.*

IEEE Research on hadoop-based enterprise file cloud storage system Da-Wei Zhang; Fu-Quan Sun; Xu Cheng; Chao Liu Published in: 2011 3rd International Conference on Awareness Science and Technology (iCAST) Date of Conference: Sep. 27-30, 2011.*

IEEE Processing Distributed Internet of Things Data in Clouds Lizhe Wang; Rajiv Ranjan Published in: IEEE Cloud Computing (vol. 2 , Issue: 1 , Jan.-Feb. 2015) pp. 76-80 Date of Publication: Apr. 22, 2015.*

ACM Digital Library on the energy (in)efficiency of Hadoop clusters Jacob Leverich Christos Kozyrakis Newsletter ACM SIGOPS Operating Systems Review archive vol. 44 Issue 1, Jan. 2010 pp. 61-65.*

IEEE Hadoop-HBase for large-scale data Mehul Nalin Vora Published in: Proceedings of 2011 International Conference on Computer Science and Network Technology Date of Conference: Dec. 24-26, 2011.*

Jeffrey D., Sanjay G., "MapReduce: Simplified Data Processing on Large Clusters", 6th Symposium on Operating Systems Design and Implementation, pp. 137-149, USENIX Association. 2004.

Mi-Young S., "Systematic Determination of Number of Clusters Based on Input Representation Coverage", Nov. 2004, pp. 39-46, vol. 41, No. 6, NuriMedia Co., Ltd.

International Search Report dated Feb. 20, 2013 for PCT/KR2012/008986, citing the above reference(s).

* cited by examiner

FIG. 7
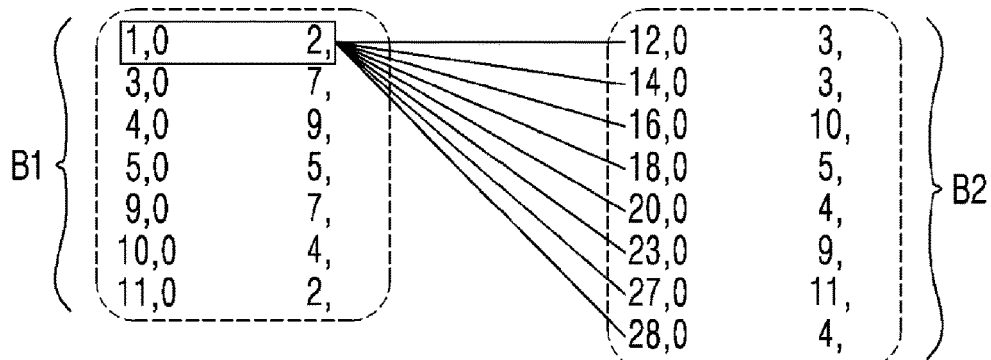
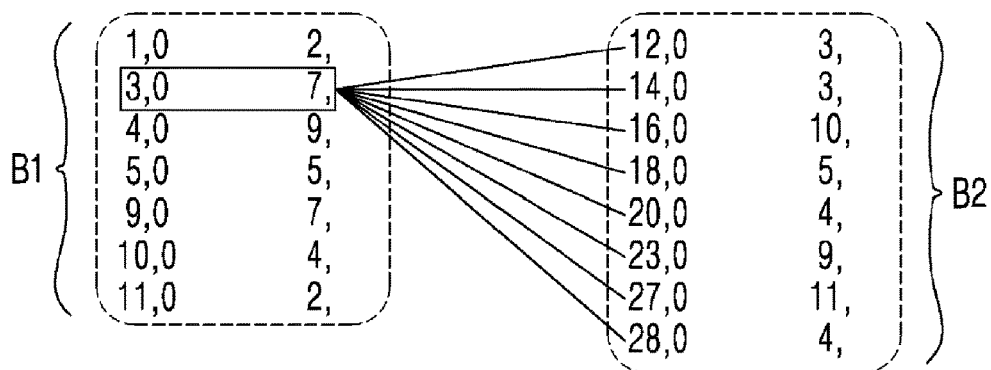
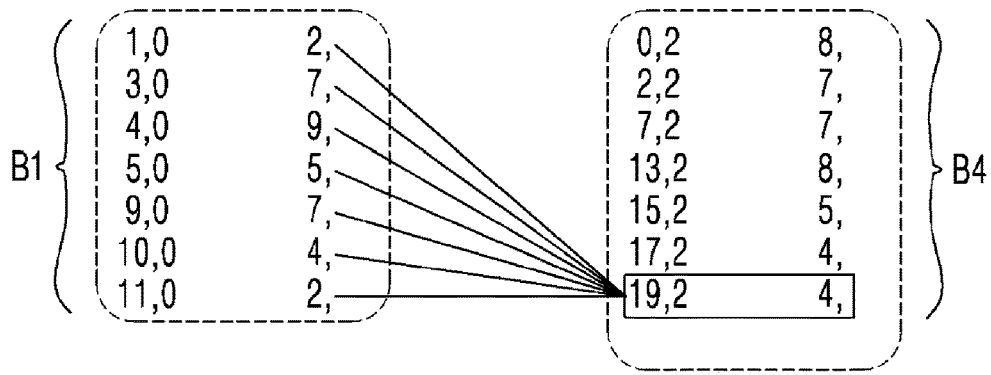

FIG. 8

| Record ID | Silhouette coefficient |
|---|---|
| 0 | −0.4 |
| 1 | 0.0418118467 |
| 2 | −0.3647058824 |
| 3 | −0.6 |
| 4 | −0.6 |
| 5 | −0.1833333333 |
| 6 | 0.1176470588 |
| 7 | −0.3647058824 |
| 8 | 0.3103448276 |
| 9 | −0.6 |
| 10 | −0.0540540541 |
| 11 | 0.0418118467 |
| 12 | 0.0476190476 |
| 13 | −0.4 |
| 14 | 0.0476190476 |
| 15 | 0.0277777778 |
| 16 | −0.4567164179 |
| 17 | −0.112 |
| 18 | −0.1833333333 |
| 19 | −0.112 |
| 20 | −0.0540540541 |
| 21 | −0.1951419514 |
| 22 | 0.1176470588 |
| 23 | −0.6 |
| 24 | −0.6347058824 |
| 25 | −0.5234482759 |
| 26 | −0.3 |
| 27 | −0.37 |
| 28 | −0.0540540541 |
| 29 | 0.3103448276 |

SYSTEM AND METHOD FOR ANALYZING RESULT OF CLUSTERING MASSIVE DATA

FIELD

The present disclosure relates to a system and a method for analyzing a result of clustering massive data, and more particularly to a system and a method, which analyze a result of clustering massive data automatically and with high reliability by using an open-source map/reduce framework named "High-availability distributed object-oriented platform (Hadoop)."

BACKGROUND

Nowadays when the world is rapidly flooded with web documents, in an existing information search system, a long list of search results obtained in response to an inquiry from a user requires a lot of time and effort in order to arrange multiple pieces of information and acquire useful knowledge.

Accordingly, a clustering technique for processing search results appropriate for requirements from the user and then acquiring relations between the search results and unexpected useful knowledge has appeared as one problem solving method. The term "clustering" refers to grouping a large amount of data into groups of similar data and automatically classifying the groups of similar data according to a particular subject. When the user requires a search for particular information, the clustering technique enables a search for only documents within a cluster corresponding to a subject which is closest to the request from the user, instead of searching for all documents. Accordingly, the use of the clustering technique can save time required to search for information, and can improve search efficiency.

A k-means algorithm which is most frequently used among the clustering techniques is as follows. First, when the user determines the number of clusters as k, the k-means algorithm is used to group found points until a center is not changed in such a manner as to repeat a process for determining a center of each cluster, finding points which are close to the center of each cluster, and then again renewing the center of each cluster by using the found points.

FIG. 1 illustrates two-dimensional data on X and Y coordinates. With respect to the two-dimensional data on X and Y coordinates as illustrated in FIG. 1, it can be intuitively determined that the two-dimensional data on X and Y coordinates is ideally divided into three clusters which have c1, c2 and c3 as their centers.

However, actual data has three dimensions or more, and a case in which a clustering result can be intuitively determined as in the graph illustrated in FIG. 1 is seldom found. In order to analyze most clustering results which cannot be intuitively determined as described above, a silhouette coefficient can serve as an index which can verify the significance of a clustering result.

The silhouette coefficient needs to calculate a distance between target data and each of all data except for the target data. Accordingly, when the number of data is equal to n, an (n−1) number of calculations are required per data, and distances are symmetrical. In this regard, a total n(n−1)/2 number of calculations are required. In other words, a computational complexity is proportional to the square of a data size.

Accordingly, in the case of massive data, the number of calculations becomes larger and thus a typical methodology is inappropriate for verifying the significance of a clustering result.

Also, simple average calculations which calculate an average distance between a cluster to which the target data belongs and clusters to which the target data does not belong is required by as many as the number of clusters. In the case of a result of clustering the massive data, one computer cannot actually perform a task while loading all data into a memory of the one computer.

SUMMARY

Therefore, the present disclosure has been made in view of the above-mentioned problems, and an aspect of the present disclosure is to provide a system and a method, which calculate and provide a silhouette coefficient for objectively analyzing a result of clustering massive data by using Hadoop.

Another aspect of the present disclosure is to provide a system and a method, which calculate and provide an analysis index quickly and with high reliability by using multiple computers even in the case of massive data when a clustering result is analyzed.

In accordance with a first embodiment of the present disclosure, there is provided a system for analyzing a result of clustering massive data, which includes: a task management apparatus configured to divide a clustered target file into blocks of a pre-designated size, and generate an input split corresponding to a task pair for a reduce task for reducing input data by combining the divided blocks; at least one distance calculation apparatus configured to receive allocation of the input split, and calculate a distance sum for each record between blocks included in the input split; at least one index coefficient calculation apparatus configured to calculate a clustering significance verification index coefficient for each record by using the distance sum for each record received from the at least one distance calculation apparatus; and an analysis apparatus configured to calculate a final significance verification index coefficient of a corresponding cluster, by averaging the clustering significance verification index coefficient for each record.

In accordance with a second embodiment of the present disclosure, there is provided a task management apparatus for analyzing a result of clustering massive data, which includes: a block generator configured to divide a clustered target file registered in a Hadoop Distribute File System (HDFS) into designated-sized blocks; an input split generator configured to combine the divided blocks and generate an input split corresponding to a task pair for a reduce task for reducing input data; and an input split assigner configured to assign the generated input split to at least one distance calculation apparatus recognized in an identical network.

In accordance with a third embodiment of the present disclosure, there is provided a distance calculation apparatus for analyzing a result of clustering massive data, which includes: a data acquirer configured to receive allocation of an input split corresponding to a task pair for a reduce task for reducing input data, and read all records of blocks included in the input split from a Hadoop Distribute File System (HDFS); a memory unit configured to store all the acquired records of the blocks; a calculator configured to calculate a distance sum for each of record between the blocks, and store the calculated distance sum for each record in the memory unit; and a data output unit configured to output the distance sum for each record.

In accordance with a fourth embodiment of the present disclosure, there is provided a method of analyzing a result of clustering massive data, which includes: dividing a clustered target file into blocks of a pre-designated size; generating an input split corresponding to a task pair for a reduce task for reducing input data by combining the divided blocks; storing all records of block included in the input split into a memory, and outputting a distance sum for each of record; calculating a clustering significance verification index coefficient for each record by using the distance sum for each record; and defining a clustering significance verification index coefficient by averaging the clustering significance verification index coefficient for each record.

According to embodiments of the present disclosure, an index for objectively analyzing a result of clustering massive data is provided.

Also, each of multiple computers performs calculation while loading data into a memory thereof, so that a processing speed becomes higher. The amount of data which is loaded into a memory at one time can be dynamically adjusted according to specifications of each computer.

BRIEF DESCRIPTION OF THE DRAWINGS

FIG. 7 is a view illustrating a method for generating an input split for analyzing a clustering result according to an embodiment of the present disclosure; and FIG. 8 is a view illustrating a silhouette coefficient for each record, which is output from a system for analyzing a clustering result according to an embodiment of the present disclosure.

DETAILED DESCRIPTION

Figure 1:
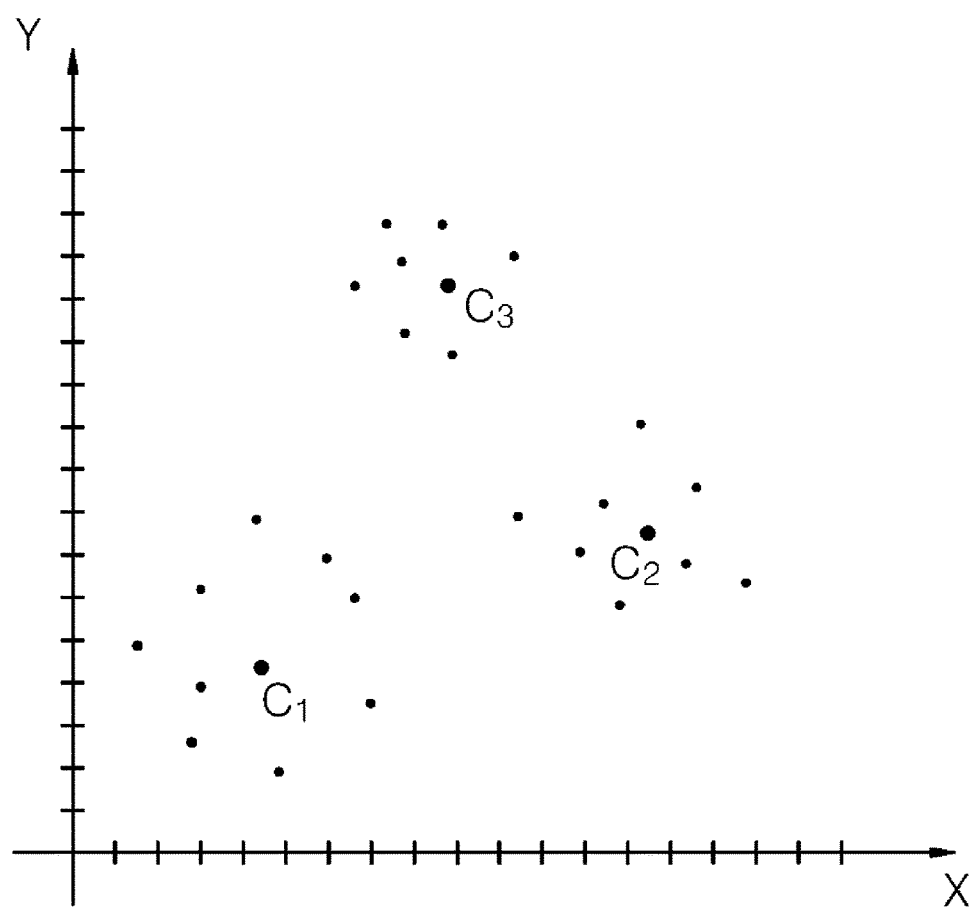
FIG. 1 is a graph illustrating a result of clustering of data.

Hereinafter, a system and a method for analyzing a result of clustering massive data according to embodiments of the present disclosure will be described in more detail with reference to the accompanying drawings. In the following description and drawings, the same reference numerals are used to designate the same or similar components, and so repetition of the description on the same or similar components will be omitted.

Before describing embodiments of the present disclosure, a clustering technique will be described below.

The term "cluster" refers to a group of similar data. According to a typical clustering methodology, all data necessarily belong to one cluster.

The term "successful clustering" implies that data is cohesively located within a cluster to which the data itself belongs and is well separated from another cluster to which the data does not belong. An objective index for indicating the successful clustering is referred to as a "silhouette coefficient." A silhouette coefficient has a larger value, as data is more cohesively located within a cluster to which the data itself belongs and is better separated from another cluster to which the data does not belong. Accordingly, the silhouette coefficient is an index coefficient for verifying the significance of a clustering result, which meets the purposes of cluster analysis.

In order to calculate a silhouette coefficient, first, a cohesion and a degree of separation need to be calculated. The cohesion is an index for measuring how closely data belonging to a particular cluster are located to the center of the relevant cluster. The cohesion is often calculated by adding squares of distances of the respective data, which belong to the particular cluster, from the center of the particular cluster. Here, centers of clusters (or cluster centers) are data representative of respective clusters as in the case of c1, c2 and c3 illustrated in FIG. 1. In other words, the center of a cluster is an average position of data belonging to the relevant cluster.

A degree of separation is an index for measuring how well each cluster is separated and how far away from other clusters, and is often calculated by adding the squares of cluster center-to-cluster center distances.

A silhouette coefficient for individual data is calculated in view of both the cohesion and the degree of separation, as follows.

1. With respect to data $D_i$, distances from the data $D_i$ to all other data existing within a cluster to which the data $D_i$ belongs are calculated, and the average of the calculated distances is defined as $a_i$.

2. With respect to the data $D_i$, for each cluster to which the data $D_i$ does not belong, distances from the data $D_i$ to all data belonging to the relevant cluster are calculated, an average distance is calculated by averaging the calculated distances, and then a minimum value from among the calculated average distances is defined as $b_i$. In other words, the average distance from the data $D_i$ to a cluster which is closest to the data $D_i$ among clusters, to which the data $D_i$ itself does not belong, is defined as $b_i$.

3. A silhouette coefficient $S_i$ for the $D_i$ has a value calculated by Equation (1) below.

$$S_i = \frac{(b_i - a_i)}{\max(a_i, b_i)} \quad (1)$$

The silhouette coefficient as calculated by Equation (1) has a value between −1 and 1. The larger the silhouette coefficient becomes, the more closely the data is located to the center of a cluster to which the data itself belongs, and the more distant the data becomes from other clusters. Accordingly, the silhouette coefficient has a desirable value which meets the purposes of cluster analysis.

The silhouette coefficient corresponds to a value having no units in view of a method for calculating a silhouette coefficient. The silhouette coefficient has characteristics such that it is not changed by the transition, rotation, and enlargement and reduction (i.e., scaling) of the entire data set and is affected by only the number of clusters or a structure thereof according to only data distribution.

The silhouette coefficient needs to calculate a distance between target data and each of all data except for the target data. Accordingly, when the number of data is equal to n, an (n−1) number of calculations are required per data. And because distances are symmetrical In this regard, a total n(n−1)/2 number of calculations are required. In other words, a computational complexity is proportional to the square of a data size.

Also, simple average calculations which calculate an average distance between a cluster to which the target data belongs and clusters to which the target data does not belong is required by as many as the number of clusters. In the case of a result of clustering the massive data, the number of calculations becomes larger. Accordingly, one computer cannot actually perform a task while loading all data into a memory of the one computer. In this regard, it is required to enable multiple computers to efficiently perform calculations.

In order to efficiently calculate a silhouette coefficient by using multiple computers, Hadoop is used in an embodiment of the present disclosure.

Hadoop refers to an open-source version of a map/reduce framework that Google has developed and has released with the purpose of supporting distributed computing. This framework has been developed in order to support parallel processing of massive data (i.e., petabyte or more) in a cluster environment including multiple computers.

A typical mapreduce job in a Hadoop Distributed File System (HDFS) first has a process for generating <key, value> pairs in response to input data, and processing the generated <key, value> pairs. A map corresponds to a user-defined data structure. The typical mapreduce job is performed in a scheme for generating data each in the form of <key, value>, which are intermediate data including keys/value pairs, from the input data and then reducing the number of data in such a manner as to add values by using each key.

A task for forming a map is referred to as a "map task" and divides the input data into fixed-sized pieces referred to as "input splits." In other words, an input split is a task pair for a task (i.e., a reduce task) which reduces the input data. Hadoop generates one map task for each input split, and processes data in each input split by using a user-defined map function.

When an input split is assigned to one map task, the map task mostly serves to filter data of an input file, extract necessary information from the data of the input file, and convert the data of the input file. The map task results in generating <key, value>, which is a key/value pair, for each data record, and delivering the generated <key, value> to a reducer. Here, the term "data record" refers to a unit of data, which is used to actually read and write data when a file is accessed. In other words, a data record is a set of related data, which is treated as one unit. In the next step, the <key, value> pairs delivered as the result of the map task are appropriately partitioned to each reduce task, with a key as a reference. In each reduce task, the delivered <key, value> pairs are arranged in the order of keys, and a reduce function is performed.

A result of each reduce task is stored as a file in a HDFS.

When a silhouette coefficient is calculated through the typical map/reduce job of Hadoop as described above, traffic between map tasks and reduce tasks becomes too large to process massive data.

Figure 2:
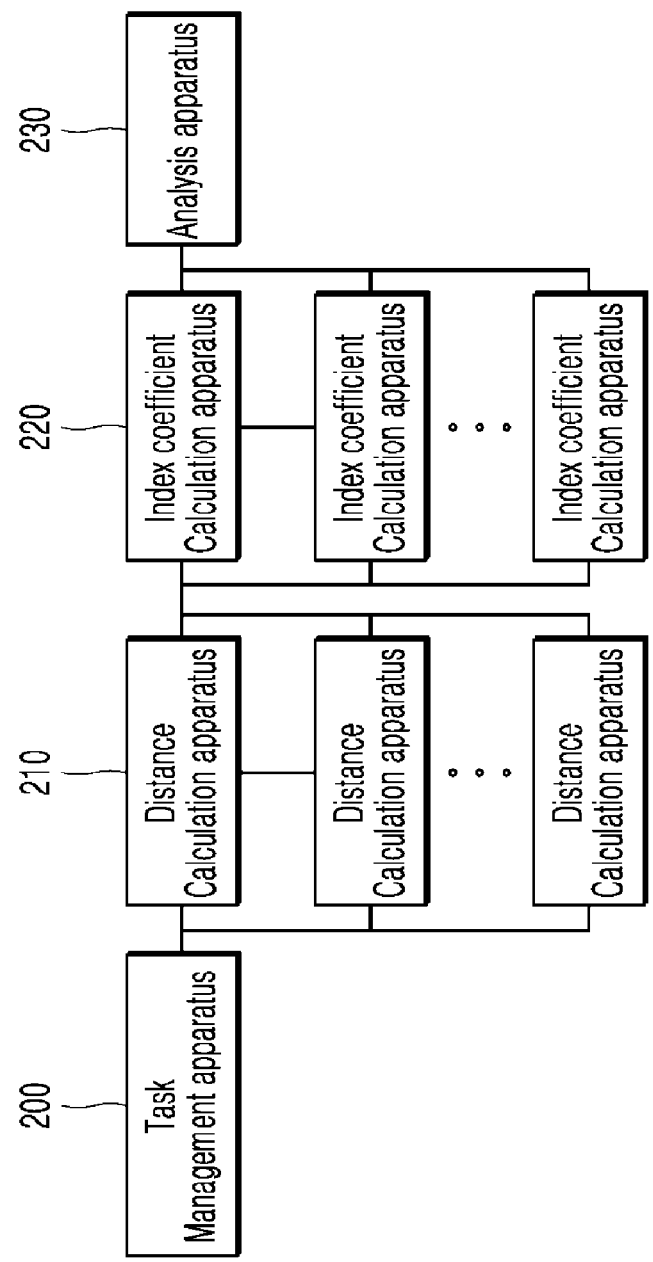
FIG. 2 is a block diagram illustrating a configuration of a system for analyzing a result of clustering massive data according to an embodiment of the present disclosure.

FIG. 2 illustrates an embodiment of the present disclosure in which the system for analyzing a result of clustering massive data includes multiple distance calculation apparatuses 210 and multiple index coefficient calculation apparatuses 220. A system for calculating an efficient index coefficient by using Hadoop according to an embodiment of the present disclosure will be described with reference to FIG. 2.

The system for analyzing a result of clustering massive data includes a task management apparatus 200, a distance calculation apparatus 210, an index coefficient calculation apparatus 220, and an analysis apparatus 230.

The task management apparatus 200 serves to receive, as input, various data required for a clustering task and assigns a task to another apparatus. More specifically, the task management apparatus 200 sets a user-designated value and the like, receives as input and stores position information of clustering result data, divides the clustering result data into blocks, and generates input splits for silhouette calculation and a map/reduce job, for all of the blocks.

The distance calculation apparatus 210 reads the content of each of two blocks from an HDFS by using information of the two blocks of an input split that the task management apparatus 200 has assigned to the distance calculation apparatus 210, stores all read records in a memory thereof, calculates all distances of counterpart records from each relevant record between the two blocks, and calculates a distance sum for each relevant record by using all the calculated distances.

The distance calculation apparatus 210 and the index coefficient calculation apparatus 220 are interconnected to the task management apparatus 200 through a network. In the system for analyzing a result of clustering massive data according to an embodiment of the present disclosure, one distance calculation apparatus or multiple distance calculation apparatuses 210 may be included, and one index coefficient calculation apparatus or multiple index coefficient calculation apparatuses 220 may be included.

The index coefficient calculation apparatus 220 calculates $a_i$, $b_i$, and $S_i$ values for each record by using result values from the distance calculation apparatus 210.

Here, $a_i$ is calculated by dividing the sum of distances of data by the sum of counts. The data have an identification number (referred to as a "record cluster IDentification (ID)") of a cluster, to which the relevant records belong, identical to an identification number (referred to as an "operand cluster ID") of a cluster to which the counterpart records which the sum of distances is calculated belong.

$b_i$ is obtained by calculating an average distance for each of identification numbers (i.e., operand cluster IDs) of clusters to which counterpart records belong, and then selecting a minimum value from among the calculated average distances according to the identification numbers of the clusters. The $b_i$ is obtained for data which have an identification number (referred to as a "record cluster ID") of a cluster, to which relevant records belong, different from an identification number (referred to as an "operand cluster ID") of a cluster to which the counterpart records belong.

A silhouette coefficient $S_i$ for each record is calculated by applying the calculated $a_i$ and $b_i$ to Equation (1).

The analysis apparatus 230 calculates the average of the silhouette coefficient values of all of the data records by using $S_i$ calculated by the index coefficient calculation apparatus 220. Also, the analysis apparatus 230 shows the number of clusters, which corresponds to the largest silhouette coefficient.

Figure 3:
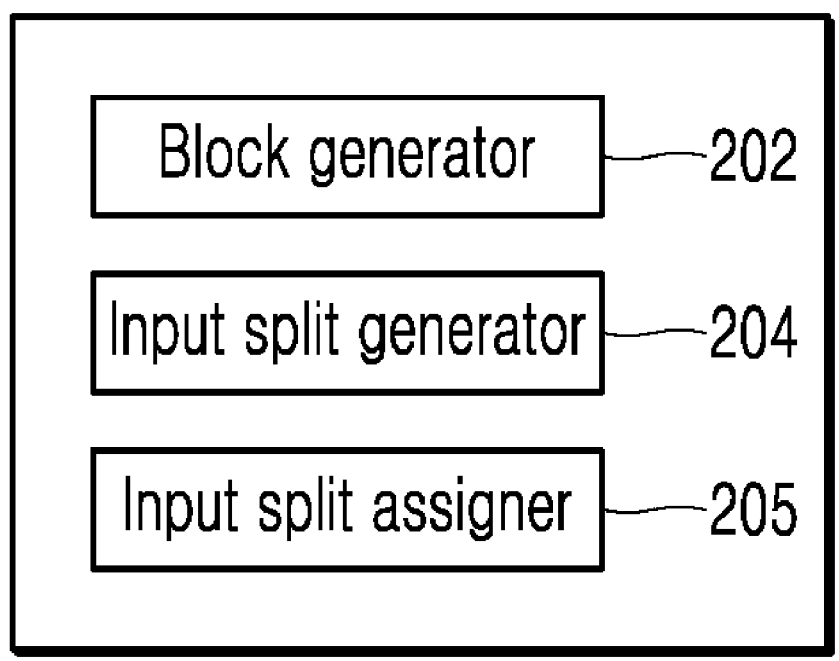
FIG. 3 is a block diagram illustrating a configuration of a task management apparatus for analyzing a result of clustering massive data according to an embodiment of the present disclosure.

A configuration of the task management apparatus illustrated in FIG. 2 will be described below with reference to FIG. 3.

The task management apparatus 200 includes a block generator 202, an input split generator 204, and an input split assigner 206.

The block generator 202 divides a clustered target file, which is registered in a Hadoop Distribute File System (HDFS), into designated-sized blocks. At this time, the clustered target file includes a record identification number, an identification number of a cluster to which the record belongs, and a coordinate value.

The input split generator 204 combines the divided blocks and generates input splits.

The input split assigner 206 serves to assign the input splits, which the input split generator 204 has generated by the input split generator 204, to the one or more distance calculation apparatuses 210 recognized in an identical network. At this time, the input split assigner 206 assigns the input splits in view of specifications of the distance calculation apparatuses 210.

Figure 4:
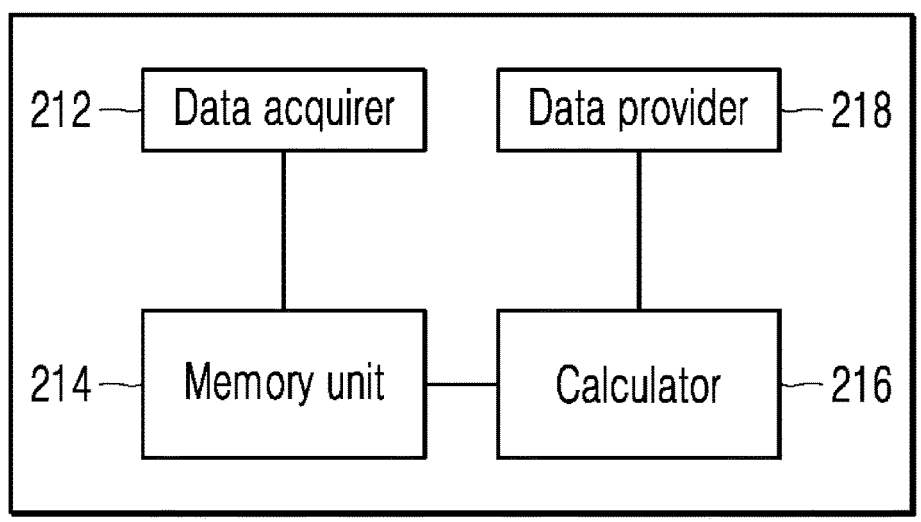
FIG. 4 is a block diagram illustrating a configuration of a distance calculation apparatus for analyzing a result of clustering massive data according to an embodiment of the present disclosure.

A configuration of the distance calculation apparatus 210 illustrated in FIG. 2 will be described below with reference to FIG. 4.

The distance calculation apparatus 210 includes a data acquirer 212, a memory unit 214, a calculator 216, and a data provider 218.

When the data acquirer 212 is assigned an input split, the data acquirer 212 reads all records of blocks included in the input split from the HDFS.

The memory unit 214 stores all the records of the blocks which the data acquirer 212 has read.

The calculator 216 calculates the sum of distances of each record from the blocks combined according to the input split, and stores the calculated distance sum for each record into the memory unit 214.

The data provider 218 outputs the distance sum for each record. The data which is output at this time includes an identification number of a record, an identification number C1 of a cluster to which the record belongs, an identification number C2 of a cluster to which counterpart records belong, the number of cases in which the identification number of the record is identical to that of a counterpart record, and a distance sum.

Figure 5:
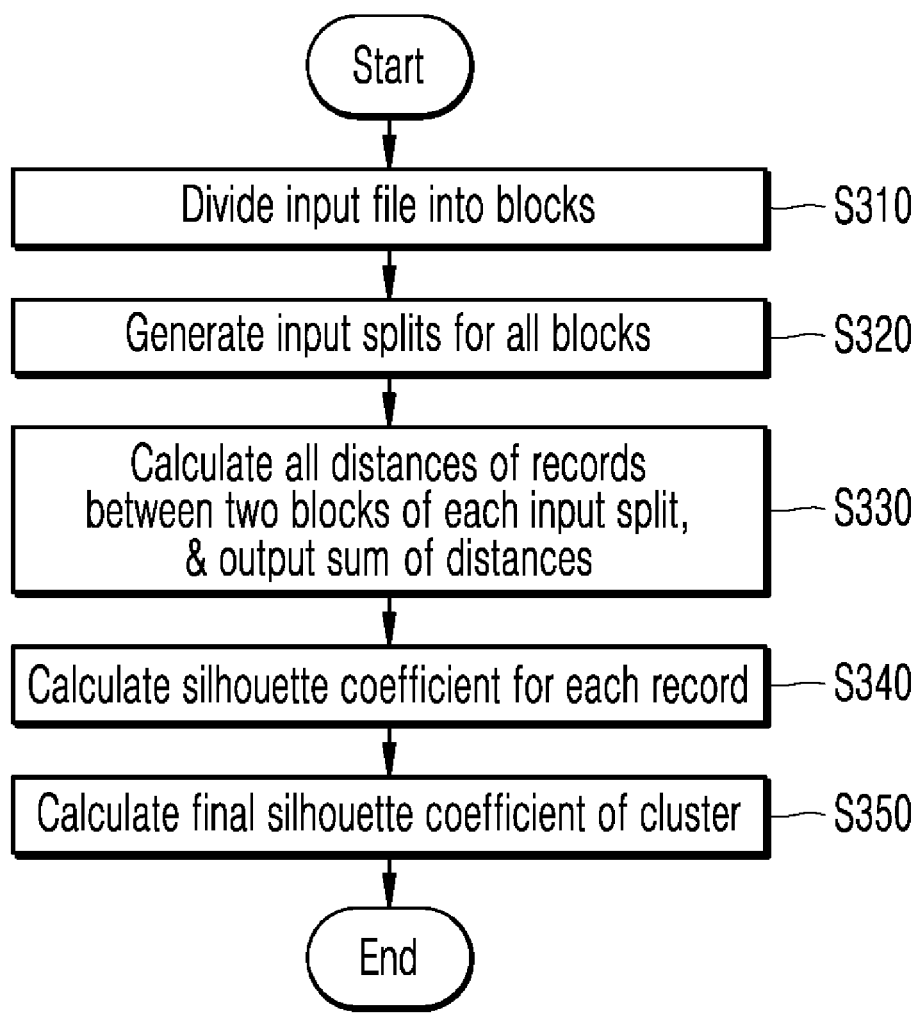
FIG. 5 is a flowchart illustrating a method for analyzing a result of clustering massive data according to an embodiment of the present disclosure.

A method for calculating a cluster silhouette coefficient by using Hadoop according to an embodiment of the present disclosure will be described below with reference to FIG. 5.

First, in order to analyze a clustering result, an input file is divided into multiple blocks, in step S310. In step S310, the user can adjust a unit of block (e.g., 2 MB) according to a network or system environment. In an example illustrated in FIG. 6, it can be noted that input data is divided into five blocks B1 to B5 in order. A format of data of each block includes an identification number of a record, an identification number of a cluster to which the record belongs, and a coordinate value of the record, from the front of the format of the data of each block. In first data of B1, an identification number of a record is 1, an identification number of a cluster to which this data record belongs is 0, and a coordinate value of this data record is 2.

Next, as illustrated in FIG. 7, combinations are generated by two for all of the blocks, and an input split is generated for each combination. Then, an input split is generated even for each pair of identical blocks. After the generation of input splits is completed, the task management apparatus 200 generates one map task per input split, and assigns each map task to the distance calculation apparatus 210, in step S320.

When there are a total m number of blocks, input splits and map tasks, the number of each of which is calculated by Equation (2) below, are generated.

$$\{m*(m-1)/2\}+m \quad (2)$$

Figure 6:
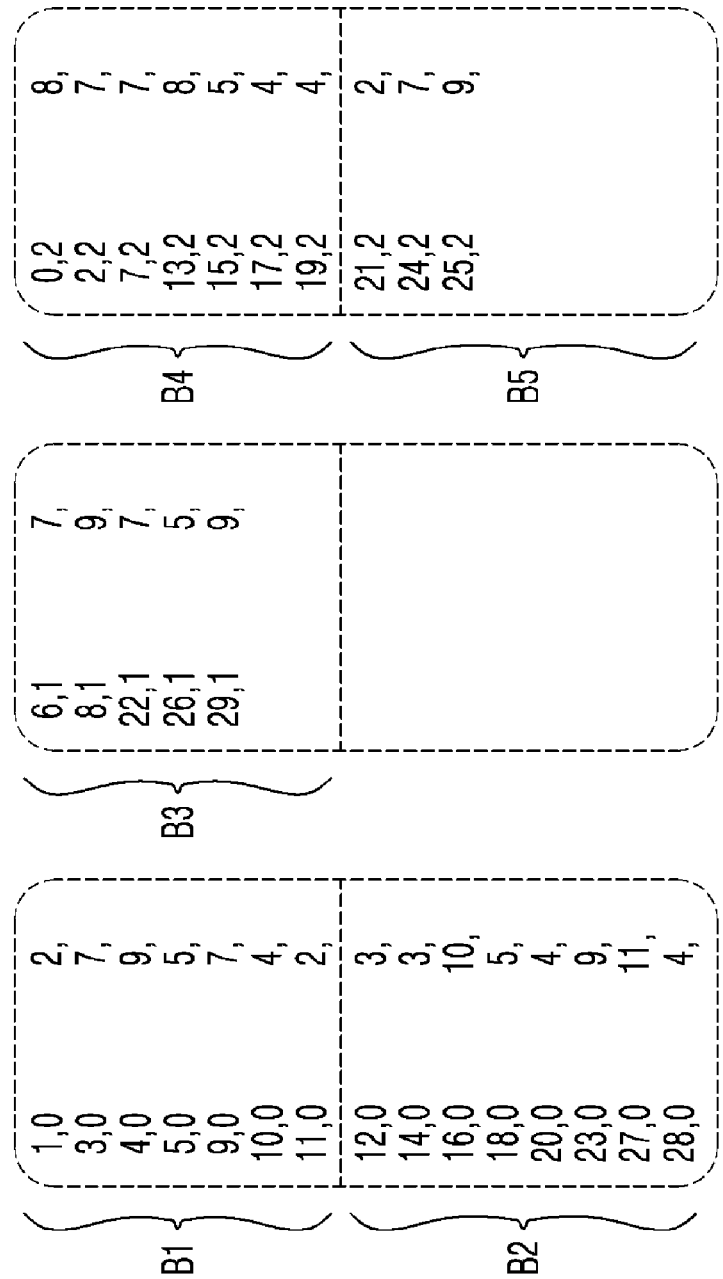
FIG. 6 is a view illustrating a method for dividing input data into blocks in order to analyze a clustering result according to an embodiment of the present disclosure.

When there are five blocks B1 to B5 as illustrated in FIG. 6, 15 input splits and 15 map tasks are generated as calculated by Equation (2). The 15 input splits and the 15 map tasks are as follows:

M1 (B1, B1), M2(B1, B2), M3(B1, B3), M4(B1, B4), M5(B1, B5), M6(B2, B2), M7(B2, B3), M8(B2, B4), M9(B2, B5), M10(B3, B3), M11(B3, B4), M12(B3, B5), M13(B4, B4), M14 (B4, B5), and M15 (B5, B5).

The distance calculation apparatus 210 stores, in the memory, all data read from two blocks of each input split, calculates all distances from data to data between the two blocks, and delivers the calculated sum of the distances and the calculated number of data to the index coefficient calculation apparatus 220, in step S330.

When the three distance calculation apparatuses 210 are included, the task management apparatus 200 assigns 15 map tasks to the three distance calculation apparatuses 210. In the present example, the task management apparatus 200 assigns tasks in real time in view of positions of data, a current task processing situation of each of the three distance calculation apparatuses 210, and the amount of extra resources.

Each of the distance calculation apparatuses 210 is assigned a map task by the task management apparatus 200, and calculates a distance between records. When the map task that each of the distance calculation apparatuses 210 is processing is normally completed, each of the three distance calculation apparatuses 210 notifies the task management apparatus 200 of the state of processing the map task, and is assigned and processes the next task. When all map tasks are normally completed, a reduce task begins.

When one distance calculation apparatus 210 is assigned the map task M2(B1, B2), the one distance calculation apparatus 210 reads meta information (the position and name of a file to which a block belongs, offset information thereof, etc.) on the block B1 and the block B2 from the task management apparatus 200, reads data of the actual blocks B1 and B2 by using the read meta information, stores the read data in the memory unit of the distance calculation apparatus 210, and then calculates all distances from data of the block B1 to data of the block B2 with respect to the blocks B1 and B2 included in the input split.

A process for calculating a distance between data belonging to the input split (B1, B2) matched to the map task M2 is described with reference to FIG. 7. All distances are calculated between identification numbers 1, 3, 4, 5, 9, 10 and 11 of records belonging to the block B1 and identification numbers 12, 14, 16, 18, 20, 23, 27 and 28 of records belonging to the block B2. Result values for an identification number 1 of a first record of the input split (B1, B2) are described. The number of counterpart records of the block B2 is equal to 8, and the sum of distances between the first record (the identification number 1) of the input split (B1, B2) and the counterpart records (the identification numbers 12, 14, 16, 18, 20, 23, 27 and 28) is equal to 33.

A format of output data of a map task includes an identification number of a record, an identification number of a cluster to which the record belongs, an identification number of a cluster to which counterpart records belong, the number of the counterpart records used to calculate distances of the counterpart records from the record, and the sum of the distances.

As described above, distances of records between blocks according to an input split are simultaneously calculated by multiple computers (the distance calculation apparatuses 210) connected in one network. Accordingly, time required for the calculations can be reduced. Only the calculated result values are delivered to the index coefficient calculation apparatus 220. Accordingly, the load and overall network traffic of the index coefficient calculation apparatus 220 can be reduced.

The index coefficient calculation apparatuses 220 receive result values delivered by the distance calculation apparatuses 210, and calculate $a_i$, $b_i$ and $S_i$ values for each record, in step S340.

One or more index coefficient calculation apparatuses 220 may be included. For accurate calculation, an index for one record needs to be calculated by one index coefficient calculation apparatus 220. To this end, an identification number of an identical record is delivered to the identical index coefficient calculation apparatus 220 when the map task partitions results to a reduce task, hashing is performed on identification numbers of records in order to prevent an excessively large amount of data from being provided to one index coefficient calculation apparatus 220, modulo arithmetic is performed by the number of the index coefficient calculation apparatuses 220, and an index coefficient calculation apparatus 220 is selected by using a result of performing the modulo arithmetic.

$a_i$ is calculated by using counts of data which have an identification number of a cluster to which relevant records belong identical to an identification number of a cluster to which counterpart records belong, and the sum of distances. For $b_i$, in the case of data which have an identification number of a cluster to which relevant records belong different from an identification number of a cluster to which counterpart records belong, an average distance is calculated for each of identification numbers of clusters to which counterpart records belong, and then a minimum value is selected as $b_i$ from among the calculated average distances. $S_i$ is calculated by applying the calculated $a_i$ and $b_i$ to Equation (1).

FIG. 8 is a view illustrating an example of a final index coefficient value for each record.

A silhouette coefficient for each record can be noted from FIG. 8.

A final silhouette coefficient of a relevant cluster is obtained by calculating the average of silhouette coefficient values according to the records, in step S350.

Table 1 shows a final index coefficient value for each record. Each data record has a 16-dimensional value, and is assigned a random value which obeys a Gaussian distribution with four centers as the center. Table 1 is a result obtained by performing calculations by a Hadoop cluster including 10 machines.

TABLE 1

| Data count | The number of clusters | Index coefficient value | Processing time |
|---|---|---|---|
| 100,000 | 3 | 0.648267665 | 5 minutes |
| 100,000 | 4 | 0.859464031 | 6 minutes |
| 100,000 | 5 | 0.654348892 | 10 minutes |
| 100,000 | 6 | 0.449449654 | 11 minutes |
| 500,000 | 3 | 0.557022375 | 15 minutes |
| 500,000 | 4 | 0.835179601 | 15 minutes |
| 500,000 | 5 | 0.641800977 | 15 minutes |
| 500,000 | 6 | 0.431964095 | 15 minutes |

TABLE 1-continued

| Data count | The number of clusters | Index coefficient value | Processing time |
|---|---|---|---|
| 1,000,000 | 3 | 0.687824356 | 1 hour 18 minutes |
| 1,000,000 | 4 | 0.869303911 | 1 hour 19 minutes |
| 1,000,000 | 5 | 0.660883303 | 1 hour 29 minutes |
| 1,000,000 | 6 | 0.659735986 | 1 hour 26 minutes |

In Table 1, it can be noted that an index coefficient has the largest value when the number of clusters is equal to 4. Also, it can be noted that 1,000,000 data sets are processed within 1 hour 30 minutes.

The automated clustering method according to embodiments of the present disclosure may be implemented in a program instruction type that may be performed by various computer means, and may be recorded in a computer-readable recording medium. The computer-readable recording medium may include program instructions, data files and data structures, alone or in combination. The program instructions recorded in the computer-readable recording medium may be specially designed and configured for the present disclosure, or would have been well-known to those skilled in the field of computer software. Examples of the computer-readable recording medium include magnetic media such as hard disks, floppy disks and magnetic tapes, optical media such as a Compact Disc Read-Only Memory (CD-ROM) and a Digital Versatile Disc (DVD), magneto-optical media such as floppy disks, and hardware devices such as a Read-Only Memory (ROM), a Random Access Memory (RAM) and a flash memory, which are specially configured to store and perform program instructions. The computer-readable recording media may be transmission media such as light, a metal wire, or a waveguide including a carrier for carrying a signal designating program instructions, data structures, and the like. Examples of the program instructions include a machine language code generated by a compiler and a high-level language code that a computer can execute by using an interpreter and the like. The hardware devices may be configured to operate as at least one software module to perform the operations of the present disclosure, and vice versa.

Although exemplary embodiments of the present disclosure have been described as shown above, it will be understood that various modifications and variations can be made by those skilled in the art to which the present disclosure pertains without departing from the spirit and scope of the present disclosure described in the below claims.

INDUSTRIAL APPLICABILITY

Conventionally, in the case of a silhouette coefficient corresponding to an index for verifying the significance of clustering of massive data, one computer cannot actually perform a task while loading all data into a memory of the one computer. However, the system for analyzing a result of clustering massive data according to exemplary embodiments of the present disclosure enables a user perform a task by using multiple computers, depending on a system environment, and thus can be widely used in the field of verifying the clustering significance.

The invention claimed is:

1. A system for analyzing a result of clustering massive data, the system comprising:

a task management apparatus comprising a first processor and connected with a Hadoop Distribute File System (HDFS) via a network, said first processor configured to:
  divide a clustered target file registered in the HDFS into a plurality of blocks where each block has a designated size,
  combine blocks of the plurality of blocks to form a plurality of block pairs, where each block pair includes a first block and a second block,
  generate a plurality of input splits, where a number of input splits in the plurality of input splits corresponds to a number of block pairs for reducing input data,
  assign a different input split of the plurality of input splits to each block pair of the plurality of block pairs, and
  assign a map task to each input split of the plurality of input splits;
a distance calculation apparatus comprising a second processor and a storage device, and connected with the HDFS and task management apparatus via the network, said second processor configured to:
  receive, from the task management apparatus via the network, allocation of the input splits,
  read all records of the block pair included in the respective input split from the HDFS, where each record associated with the plurality of block pairs includes an identification number of a record, an identification number of a cluster to which the record belongs, and a coordinate value,
  store all the read records of the plurality of block pairs into the storage device, and
  calculate a distance sum for each record between the first and second blocks included in the respective input split based on the identification number of a record, the identification number of a cluster, the coordinate value and the assigned map task, and
  output distance data including the calculated distance sum for the each record;
an index coefficient calculation apparatus comprising a third processor and connected with the HDFS and distance calculation apparatus via the network, said third processor configured to:
  receive, from the distance calculation apparatus via the network, the calculated distance sum for the each record,
  perform hashing on the identification number of the each record, and
  calculate a silhouette coefficient value, a cohesion value, and a degree of separation for the each record using the distance data for the each record received from the distance calculation apparatus; and
an analysis apparatus comprising a fourth processor and connected with the HDFS and index coefficient calculation apparatus via the network, said fourth processor configured to:
  receive, from the index coefficient calculation apparatus via the network, the calculated silhouette coefficient for the each record and
  calculate a clustering silhouette coefficient of a corresponding cluster, by averaging the received silhouette coefficient for the each record,
wherein the first processor is configured to:
  recognize the distance calculation apparatus in the network, and
  assign the generated input split to the distance calculation apparatus recognized in the network, and wherein the number of input splits is calculated according to the following equation, $$N = \{m \times (m-1)/2\} + m$$

where N is the number of input splits and m is the number of the divided blocks.

2. The system as claimed in claim 1,
wherein the distance data includes
  the identification number of a record,
  the identification number (C1) of a cluster to which the record belongs,
  the identification number (C2) of a cluster to which counterpart records belong,
  the number of cases in which the identification number of the record is identical to an identification number of a counterpart record, and
  the calculated distance sum, and
wherein the silhouette coefficient for the each record IS calculated according to the following equation, $$S_i = \frac{(b_i - a_i)}{\max(a_i, b_i)}$$

where
  $S_i$ is the silhouette coefficient for the each record (i),
  $a_i$ is a cohesion corresponding to an average value of distance of record having a C2 identical to a C1, and
  $b_i$ is a degree of separation by taking a minimum value from among record belonging to the C1, and an average value of distance of record having the C2 different from the C1.

3. A method of analyzing a result of clustering massive data, the method performed by a system connected to a Hadoop Distribute File System (HDFS) via a network, said system comprising a task management apparatus having a first processor, a distance calculation apparatus having a second processor and a storage device and connected to the task management apparatus via the network, an index coefficient calculation apparatus having a third processor and connected to the distance calculation apparatus via the network, and an analysis apparatus having a fourth processor and connected to the index coefficient calculation apparatus via the network, the method comprising:
  dividing, by the first processor, a clustered target file registered in the HDFS into a plurality of blocks where each block has a designated size;
  combining, by the first processor, blocks of the plurality of blocks to form a plurality of block pairs, where each block pair includes a first block and a second block;
  generating, by the first processor, a plurality of input splits, where a number of input splits in the plurality of input splits corresponds to a number of block pairs;
  assigning, by the first processor, a different input split of the plurality of input splits to each block pair of the plurality of block pairs;
  assigning, by the first processor, a map task to each input split of the plurality of input splits;
  receiving, by the second processor, the assigned input splits from the task management apparatus through the network;
  reading, by the second processor and from the HDFS, all records of the block pair included in the respective input split, where each record associated with the plurality of block pairs includes an identification number of a record, an identification number of a cluster to which the record belongs, and a coordinate value;

storing, by the second processor, all the read records of the plurality of block pairs into the storage device, calculating a distance sum for each record between the first and second blocks included in the respective input split based on the identification number of a record, the identification number of a cluster, the coordinate value and the assigned map task, and outputting distance data including the calculated distance sum for the each record;

receiving, by the third processor, the calculated distance sum for the each record from the distance calculation apparatus via the network, and performing hashing on the identification number of each record;

calculating, by the third processor, a silhouette coefficient value, a cohesion value, and a degree of separation for the each record using the received distance data; and receiving, by the fourth processor, the calculated silhouette coefficient for the each record from the index coefficient calculation apparatus through the network;

calculating, by the fourth processor, a clustering silhouette coefficient of a corresponding cluster by averaging the received silhouette coefficient for the each record, wherein the first processor recognizes the distance calculation apparatus in the network and the generated input split is assigned to the recognized distance calculation apparatus in the network, and wherein the number of input splits is calculated according to the following equation, $$N = \{m \times (m-1)/2\} + m$$

where N is the number of input splits and m is the number of the divided blocks.

4. The method as claimed in claim 3, wherein
from the dividing of the clustered target file to the calculating of the clustering silhouette coefficient is repeatedly performed for a pre-designated number of clusters.

5. The method as claimed in claim 3, wherein the distance data includes
the identification number of a record,
the identification number (C1) of a cluster to which the record belongs,
the identification number (C2) of a cluster to which counterpart records belong,
the number of cases in which the identification number of the record is identical to an identification number of a counterpart record, and
the calculated distance sum, and
wherein the silhouette coefficient for the each record IS calculated according to the following equation, $$S_i = \frac{(b_i - a_i)}{\max(a_i, b_i)}$$

where
$S_i$ is the silhouette coefficient for the each record (i),
$a_i$ is a cohesion corresponding to an average value of distance of record having a C2 identical to a C1, and
$b_i$ is a degree of separation by taking a minimum value from among record belonging to the C1, and an average value of distance of record having the C2 different from the C1.

* * * * *